United States Patent [19]
Dewispelaere et al.

[11] Patent Number: 5,419,370
[45] Date of Patent: May 30, 1995

[54] GRIPER WELF INSERTER SWITCHING DEVICE

[75] Inventors: André Dewispelaere, Kortrijk/Marke; Nico Gheysen, Sint-Eloois-Winkel, both of Belgium

[73] Assignee: N.V. Michel van de Weile, Kortrijk-Marke, Belgium

[21] Appl. No.: 82,268

[22] Filed: Jun. 23, 1993

[30] Foreign Application Priority Data

Jun. 23, 1992 [BE] Belgium .............................. 09200587

[51] Int. Cl.⁶ ..................... D03D 39/16; D03D 47/27
[52] U.S. Cl. ................................. 139/449; 192/18 R; 192/67 P; 192/93 R
[58] Field of Search ............ 139/449; 192/67 P, 93 R, 192/93 A, 12 R, 18 R; 74/331

[56] References Cited

U.S. PATENT DOCUMENTS

| | | | |
|---|---|---|---|
| 870,288 | 11/1907 | Hartness | 192/93 R |
| 1,753,085 | 4/1930 | Peterson | 192/93 R X |
| 3,910,131 | 10/1975 | Richards . | |
| 3,999,580 | 12/1976 | Sparling | 139/449 |
| 4,878,292 | 11/1989 | Santandrea et al. . | |
| 5,033,516 | 7/1991 | Debaes | 139/449 |
| 5,183,083 | 2/1993 | Debaes | 139/449 |

FOREIGN PATENT DOCUMENTS

| | | |
|---|---|---|
| 868946 | 7/1978 | Belgium . |
| 0362433 | 4/1990 | European Pat. Off. . |
| 1555432 | 3/1967 | France . |

Primary Examiner—Andrew M. Falik
Attorney, Agent, or Firm—Brumbaugh, Graves, Donohue & Raymond

[57] ABSTRACT

A gripper device for a weaving loom having a drive shaft, which rotates in one direction of rotation and the other direction in an alternate manner, where the gripper device has a drive gear rotatably disposed on the drive shaft. This drive gear has a tooth system which is engageable to the tooth system of an assembly, which is non-rotatably disposed on said drive shaft. The gripper device also includes a mechanism for engaging both tooth systems to transmit the rotational movement of the drive shaft to the drive gear, thus moving and withdrawing the gripper device into and from a shed between warp threads.

15 Claims, 3 Drawing Sheets

GRIPER WELF INSERTER SWITCHING DEVICE

BACKGROUND OF THE INVENTION

This invention relates to weaving looms which are provided with at least two devices by means of which a weft thread is inserted into the shed from one side to the other side, these devices being disposed one above the other at different levels on the weaving loom, so that weft threads can be inserted simultaneously at these different levels into sheds formed above one another, as is the case, for example, with face-to-face weaving looms provided with two devices which can insert a weft thread simultaneously into the shed of top fabric and bottom fabric.

The invention relates more particularly to weaving looms in which the abovementioned devices are gripper devices.

In the case of known weaving looms with two or more gripper devices, each gripper device consists of two interacting parts which are disposed on either side of the weaving loom, each comprising a drive device with a drive gear disposed on the drive shaft, a gripper bar extending in the breadthwise direction of the weaving loom, which bar can be driven by the drive gear so that it moves with one end from the side of the weaving loom along a guide device to the center and back, while a gripper is fixed on said end of the gripper bar.

The two parts of a gripper device interact in such a way that the grippers meet each other in the center of the weaving loom (in the shed). At that point a weft thread carried from one side of the weaving loom by one gripper (the giver gripper) is taken over by the other gripper (the taker gripper), which then takes this weft thread along on its return movement to the other side of the weaving loom.

During single-spool face-to-face weaving, one weft is inserted alternately into the top fabric and into the bottom fabric.

For such a weaving process, use is made of known single-gripper weaving looms. These looms are provided with a single weft insertion device, for example, a gripper device of the type described above, which in each case inserts the weft thread at the same level. These looms are also provided with weaving frames which pull the foundation and pile warp threads towards the level of the gripper, forming a shed. In this weaving method the warp threads must thus be pulled in such a way that the shed is formed between warp threads extending above the level of the gripper and warp threads extending below that level, the gripper being disposed at a fixed level or moving along with the sley at a fixed level. In the beating-up position of the reed, all foundation warp threads of the top web must be in their top position, and all foundation warp threads of the bottom web must be in their bottom position, in such a way that these foundation warp threads develop a great enough force component to pull the pile threads, in order to obtain sufficient pile height between bottom fabric and top fabric in this way.

The disadvantage of single-spool face-to-face weaving with such a single-gripper weaving loom lies in the fact that the foundation warp threads have to move quickly in order to obtain sufficient lift in a sufficiently short time. In particular, the foundation warp threads of the top fabric have to carry out a fairly great lift during a short period of time or, in other words, during a small angular displacement of the main shaft of the weaving loom.

European Patent Application No. 0,362,433 describes a device which means a possible solution to the abovementioned disadvantage.

This device comprises a weft insertion device which moves up and down vertically and is driven so that it inserts a weft thread successively at different levels. This makes it possible to weave a face-to-face fabric with a single spool, by making the foundation warp threads form a shed at two different levels above one another, as is usual in the case of a double-gripper weaving loom. The advantage lies in the fact that the foundation warp threads have to undergo less lift, and that the foundation warp frames can consequently be moved at a much lower speed, which has major advantages in terms of wear and energy consumption of the machine.

However, this device also has major disadvantages.

A first disadvantage lies in the fact that considerable means are necessary to move a gripper device—which consists of a drive, a gripper guide and a gripper on a gripper bar—constantly up and down, so that this is a time-consuming and expensive solution to the abovementioned disadvantage of a single-gripper weaving loom.

A second disadvantage of the above-described device lies in the fact that the device for moving the weft insertion device up and down will be highly susceptible to wear.

Another known solution to the problem is to weave the fabrics which are to be woven with a single spool on a double-gripper weaving loom. Such a weaving loom is provided with two gripper devices which lie one above the other, and which are provided in order to insert a weft in a shed in the top fabric and a weft in a shed in the bottom fabric simultaneously during double-spool weaving.

Providing such a weaving loom with an additional device, which alternately gives only a weft thread to, for example, the top gripper device and in a subsequent pick only a weft thread to the bottom gripper device, means that this double-gripper weaving loom can be used to weave with a single spool, so that the advantage is obtained that the foundation warp threads need only undergo a small lift, and consequently the foundation warp frames have a long enough movement time, and the movement speeds required can thus be lower.

However, this device also has a disadvantage. During each shot cycle (pick), the drive devices of both weft insertion devices drive their respective grippers to the center of the weaving loom and into the shed, so that there is always one gripper device which is operating needlessly. The energy used for driving this gripperdevice therefore has no beneficial effect at all, and is thus completely lost.

The object of the present invention is then to provide a double-gripper weaving loom by means of which it is possible to weave with a single spool, while the abovementioned disadvantage—the needless driving of a gripper device—is eliminated.

Another object is to provide for a weaving loom with more than two-gripper devices, with which it is possible without the same disadvantage—the needless operation of at least one gripper device —to weave certain weaves which do not require all gripper devices to be driven simultaneously.

SUMMARY OF THE INVENTION

One object of the invention is a device with which according to a switching cycle, adjustable or otherwise, the drive device of a gripper device of a weaving loom can be alternately switched on and off during weaving, said switching cycle running in phase with the shot cycle and being determined as a function of the characteristics of the desired weave, and being such that said drive device is switched on only when the gripper device of which said drive device forms part has to insert a weft thread in a shed formed between the warp threads. Such a device according to the invention is called a switching on and off device in what follows.

Another object of the invention is a weaving loom with at least two gripper devices, which loom is provided with at least one switching on and off device according to the invention, with such a switching cycle that during each shot cycle each drive device of the gripper device(s) having to insert a weft thread is switched on, and each drive device of the gripper device(s) not having to insert a weft thread is switched off.

Yet another object of the invention is a method for single-spool weaving of a face-to-face fabric, making of a gripper weaving loom with two (a double-gripper weaving loom) or more gripper devices situated at different levels. This method is such that when one of the gripper devices is driven in order to insert a weft thread in the fabric, no other gripper device is driven.

Another object of the invention is a method for double-spool weaving of a face-to-face fabric according to a two-shot weave, making use of a three-gripper weaving loom, this method being such that in the case of each pick the middle gripper device is driven in order to insert a weft thread in each case, while in the case of the subsequent picks the top and the bottom gripper devices are driven alternately in order to insert a weft thread in each case, while the bottom and the top gripper devices are alternately not driven.

The switching on and off device according to the invention consists of a drive gear which is disposed on the drive shaft so that it rotates about said shaft, and is provided with means by which corresponding means—which are provided on the drive shaft or on a part which can be driven by said shaft—can interact in order to transmit the rotary movement of the drive shaft to the drive gear, and said corresponding means or the part on which said means are provided, on the one hand, can be moved into a first position, in which said means interact with the means of the drive gear or in which the rotating drive shaft can drive the part, while the means of this part interact with the means of the drive gear, and, on the other hand, can be moved into a second position, in which said corresponding means do not interact with the means of the drive gear or in which the rotary drive shaft does not drive the part. Said means are controlled mechanically, electromagnetically, pneumatically or in another way, in such a way that before each pick said first or second position is assumed automatically according to a specific adjustable cycle operating in phase with the shot cycle, and in such a way that, depending on whether or not the operation of the gripper device is necessary and effective—as a function of the desired weave—said means assume either a first or a second position. The control means can be adapted, adjusted or programmed in such a way that various switching cycles can be achieved.

The advantage of the invention lies in a more efficient use of weaving looms with two or more gripper devices in order to weave certain weaves, in the case of which each gripper device does not have to be driven simultaneously with the others, and more specifically the invention provides a means which for each shot drives only the gripper device(s) which has/have to insert a weft thread, so that a gripper device which does not have to insert a weft thread is not driven needlessly. Less energy for the gripper device will therefore be needed. Wear of the gripper teeth is also considerably reduced since each gripper is subject only to the working cycles which are strictly necessary.

Another advantage of the invention lies in the fact that the switching on and off device can be achieved with limited means, will be subject to little wear, and can be designed to interact with more than two gripper devices.

The abovementioned advantages cannot (all) be found in the known devices.

BRIEF DESCRIPTION OF THE DRAWINGS

Further features and advantages of the invention are illustrated with reference to the detailed description which follows of a preferred embodiment of the invention, but this invention is not restricted to this embodiment.

This detailed description is illustrated by means of the appended.

Figure 1:
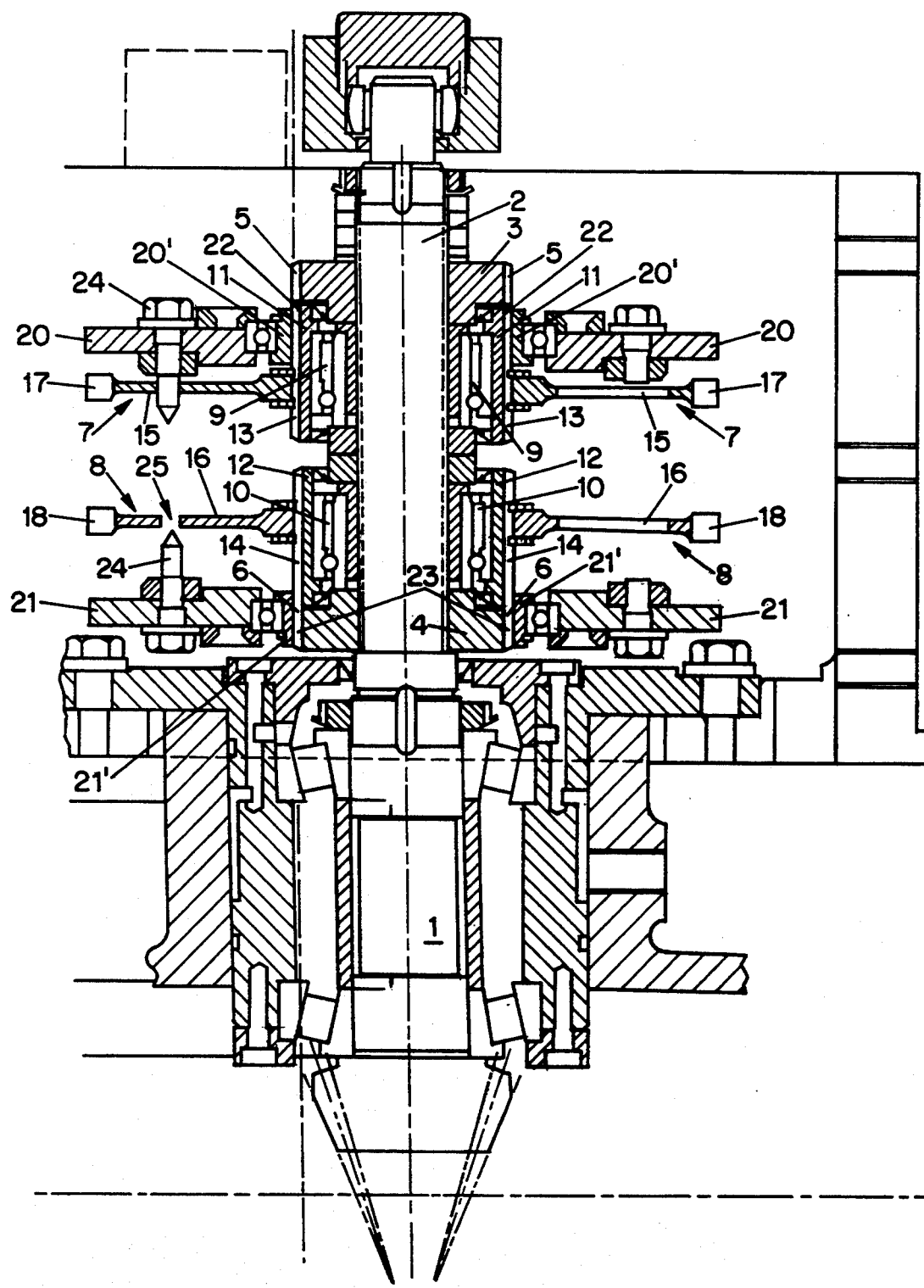
FIG. 1, which represents a vertical cross-section of a preferred embodiment of a switching on and off device according to the invention.

In a preferred embodiment of the switching on and off device according to the invention, this device comprises a drive gear of a gripper device, which gear is disposed on a drive shaft on a bearing. This drive gear is provided, on the one hand, with an external tooth system for driving a gripper bar in the known way, and is provided, on the other, with means by which said drive gear can be driven in a rotary movement jointly with the drive shaft, by an element provided with corresponding first means when said element rotates with the drive shaft.

The abovementioned element can be moved for the purpose into a first position, in which the first means or second means provided thereon mesh with corresponding means which are immovably fixed on the drive shaft, as a result of which said element is driven in a rotary movement jointly with the drive shaft, and said first means mesh with the means of the drive gear, as a result of which said drive gear is also driven in a rotary movement with the drive shaft, and in turn can drive the grippers.

The abovementioned element can also be moved into a second position, in which the abovementioned first or second means are outside the range of the corresponding means immovably fixed on the drive shaft, so that the element does not rotate with the drive shaft, and the drive gear thus does not turn with it, and the gripper remains at rest.

In order to assume either the first or the second position, the abovementioned element is driven in a known way, for example mechanically by means of a cam mechanism or by pneumatic or electromagnetic means, by other known control means, or by a combination of said means. This control is such that the element assumes the first or the second position when, according to the desired weave, the gripper device has to insert a weft thread in the fabric, or does not have to insert a weft thread, while it is, of course, ensured that the cycle of this control runs in phase with the shot cycle, so that a weft thread can be inserted at the right moment in each case. The control means can also be designed in such a way that the control cycle can be altered by adjusting certain parts and/or by replacing certain parts with other parts and/or by programming a device interacting with said control means.

A particularly advantageous embodiment of the switching on and off device according to the invention consists of a drive gear, which is nonrotatably connected to a hub bush which itself is rotatably mounted on drive shaft. The hub bush has an external cylindrical tooth system. Drive gear has an external tooth system which meshes with the gripper bar in order to move it to and fro. A driver ring is also non-rotatably disposed on the same drive shaft. Said driver ring likewise has an external cylindrical tooth system with the same diameter as the external tooth system on the hub bush.

A slide element in this embodiment consists of an annular piece with a central cylindrical opening, which is provided with an internal tooth system. The diameters of this central opening and the internal tooth system provided are such that the external tooth system of the hub bush and the external tooth system of the driver ring fit in a sliding manner into the internal tooth system of the sliding ring.

The sliding ring is disposed in such a way that the drive shaft and hub bush and driver ring extend at right angles to said annular piece through the central opening. The sliding ring can now be placed in two different positions by control means connected to the sliding ring piece. In the first position, the sliding ring piece is disposed in such a way that the driver ring and the hub bush are situated in the central opening, and the internal tooth system meshes both with the external tooth system of the hub bush of the drive gear and with the external tooth system of the driver ring. When the drive shaft rotates—regardless of the direction of rotation—the sliding ring is driven in the same direction of rotation by the driver ring, while the latter in turn drives the hub bush and thus the drive gear. The drive gear consequently rotates jointly with the drive shaft.

In the second position, the sliding ring is disposed in such a way that the hub bush is situated only in the central opening, and the internal tooth system consequently meshes only with the external tooth system of the hub bush of the drive gear. When the drive shaft rotates, the rotary movement is not transmitted to the drive gear.

An opening is provided in the disc-shaped part of the drive gear. When the drive gear is in the position in which the interacting gripper is fully outside the shed, this opening lies precisely below or above a pin which is fixed to the carrier of the sliding ring. When the sliding ring is moved into the abovementioned second position, the pin slides into the opening first, so that the drive gear is held in its idle position before the coupling to the driver ring is released.

The sliding ring is connected to means which can take it alternatively into the first and the second position according to a specific cycle. These means are controlled for the purpose by known mechanisms which are adjustable and/or programmable and/or contain exchangeable parts, through which various switching cycles can be achieved.

Two or more of such switching on and off devices can be disposed on the same drive shaft.

DETAILED DESCRIPTION

A vertically disposed drive shaft (1), (2) is driven alternately in one direction of rotation and immediately thereafter in the other direction of rotation by known drive devices with movement times which are fixed in the co,and angle of the shot cycle. Two driver rings (3), (4) are fixed non-rotatably on the drive shaft (2), so that they rotate jointly with said drive shaft (2). These driver rings (3), (4) have an external tooth system (5), (6). Two drive gears (7), (8) are rotatably fixed on bearings (9), (10) respectively on the drive shaft (2). Each drive gear (7), (8) is non-rotatably fixed to hub bush (11), (12) with an external tooth system (13), (14) respectively on the periphery and, has a disc-shaped part (15), (16) which extends symmetrically relative to and at right angles to the walls of said central cylindrical parts (11), (12). External tooth systems (17), (18) are provided on the periphery of said disc-shaped parts (15), (16). The external diameter of the cylindrical parts (11), (12) of the hub bushes is identical to the external diameter of the driver rings (3), (4), and the tooth systems (13), (14) provided thereon are identical to the respective tooth systems (5), (6) on the periphery of the driver rings (3), (4).

The driver rings (3), (4) and the hub bushes (11), (12) of the drive gears (7), (8) are disposed coaxially on the drive shaft (2), the drive gears (7), (8) being placed above one another, and the driver rings (3), (4) being disposed on the shaft (2) above and below the two drive gears (7), (8) respectively, in such a way that the driver rings (3), (4) abut the parts of the bearing (9) and the bearing (10) respectively fixed on the drive shaft (2), while the outside wall of the hub bush (11), (12) of the drive gear (7), (8) respectively, which bushes are rotatable on the bearings (9), (10) respectively, goes a short distance from the outside wall the driver ring (3), (4) respectively, and said, outside walls of driver ring (3) and part (9) and driver ring (4) and part (10) respectively, having the same diameter, lie in line with each other, and consequently the tooth systems (5) and (13) and (6) and (14) respectively also lie in line with each other, with a small space between them.

The switching on and off device in this preferred double embodiment according to the invention also consists of two identical sliding rings (20'), (21'), provided with an internal tooth system (22), (23). The diameter of these openings and the features of this internal tooth system are such that the sliding rings (20'), (21') can be disposed coaxially relative to the drive shaft (2), with the hub bush (11), (12) respectively of the drive gears (7), (8) and/or with the driver ring (3), (4) respectively lying in the central opening, FIG. 2 the respective internal tooth systems (22), (23) can mesh with the external tooth systems (13), (14) respectively of the hub bushes (11), (12) of the drive gears (7), (8) and/or the external tooth system (5), (6) respectively of the driver rings (3), (4).

Each sliding ring (20'), (21') is connected to a switch plate (20), (21), which in turn can be moved by means of a cam mechanism, for the purpose of making the sliding ring assume a first and second position alternately according to a cycle determined by the cams, in phase with the shot cycle.

In FIG. 1 the top sliding ring (20') is situated in the second position, and the bottom sliding ring (21') is situated in the first position. In the first position, the sliding ring (20'), (21') is situated at such a height that its internal tooth system (22), (23) Can mesh only with the external tooth system (13), (14) of the hub bushes (11), (12) of the drive gear (7), (8).

In the second position, the sliding ring (20'), (21') is situated at such a height that its internal tooth system (22), (23) can mesh both with the external tooth system (13), (14) of the hub bushes (11), (12) of the drive gear (7), (8) and with the external tooth system (5), (6) of the driver ring (3), (4).

In this second position, the rotary movement of the drive shaft (2) is transmitted by means of the driver ring (3), (4) and the sliding ring (20'), (21') to the drive gear (7), (8).

In the first position, the sliding ring (20'), (21') is not driven by the driver ring (3), (4), so that both the sliding ring (20'), (21') and the drive gear (7), (8) remain idle, An opening (24) is provided in the disc-shaped part (15), (16) of each drive gear (7), (8). When the gripper driven by a particular drive gear (7), (8) has been moved fully out of the shed, said drive gear (7), (8) is still in the same position, with the opening (24) opposite a pin (25) disposed on the switch plate (20), (21). This switch plate is held non-rotatably by known means.

When the sliding ring (20'), (21') is placed in the second position, the pin (25) goes into the opening (24). The drive gear (7), (8), which in the second position is not driven by the drive shaft (2), is in that way prevented from still rotating and thus finding the synchronization point again in each case. The pin (25) first goes into opening (24) before the connection between driver and sliding ring is released, and the pin (25) leaves bore (24) only when the connection between driver and sliding ring has already come about. In this way the synchronisation is not lost.

In the case of weaving looms in which each gripper device consists of two parts disposed on either side of the weaving loom, each comprising a drive gear and a gripper driven by said drive gear, such a switching on and off device is provided on either side of the weaving loom.

The vertical drive shaft rotates in one direction in order to insert the grippers by means of their drive gears in the shed of the fabric, and immediately afterwards in the other direction in order to remove said grippers from the shed.

A certain idle period then follows for the grippers, during which the weft threads are beaten up by the movement of the reed.

During this idle period it will be ensured by means of the switching on and off device according to the invention that each gripper which has to insert a weft thread at the next shot is (or remains) switched on, and that each gripper which does not have to insert a weft thread at the next shot is (or remains) switched off, by moving the respective switching on and off devices into, or holding them in, the second and first position respectively.

This switching on or off is carried out by means of the switch plate (20), (21) which can drive the sliding ring (20'), (21') when it is moved.

The movement of said switch plate is in turn obtained through its connection to a cam and rod mechanism (not shown).

This cam and rod mechanism is such that the switching pattern of the switching on and off device according to the invention takes place according to the features of the desired weave.

For single-gripper weaving with alternately a pick in the top fabric and a pick in the bottom fabric, according to a method according to the invention, the top gripper will be switched on and the bottom gripper switched off alternately, and at the next shot the bottom gripper will be switched on and the top gripper switched off.

This switching on and off device according to the invention can also be set up in conjunction with three or four or more grippers which are placed above one another, in order to, weave certain weaves. A device with three grippers, FIG. 3 for example, can be used very effectively in order to weave a two-shot weave without mixing contours by another method according to the invention. In the case of this method, the middle grippers 41 will be switched on in each shot; the top gripper 40 will be switched on and the bottom gripper (42) switched off at the first shot, and vice versa at the following shot. The advantages of this weaving method are as follows: the tension warp threads do not need to make any lift and can be disposed in a stationary manner; the binder warp threads have an additional movement time: the binder warp threads of the top fabric can cross while the weft threads are being inserted in the bottom web; the bound-in pile warp threads do not need to carry out any lifts; the weave causes no mixing contours, and in the pattern definition 1 pick in the card drawing is one pile row.

This device with three controllable grippers can also be used for achieving a single-shot weave with bound-in dead pile according to a method according to the invention, in the case of which the working sequence is as follows: first shot operates the middle gripper (the others are switched off), second shot operates the top, third shot the bottom, fourth shot the middle. In this case the tension warp threads must be returned to stationary, the binder warp threads are given additional movement time, and no lifts are needed to bind in the dead pile warp threads.

Several switching on and off devices according to the invention, set up in order to work in conjunction with two or more weft insertion devices on a weaving loom, form another subject of this invention.

Face-to-face fabrics which have been woven directly by a method according to this invention also form a subject of this invention.

We claim:

1. A gripper device for a weaving loom having a drive shaft, which rotates in one direction of rotation and the other direction thereof in an alternate manner, said gripper device comprising:
    first coupling means adapted to be non-rotatably disposed on said drive shaft;
    second coupling means adapted to be rotatably disposed on said drive shaft; and
    means for synchronously engaging said first coupling means with said second coupling means to cause said gripper device to move into a shed between warp threads and for disengaging said first coupling means from said second coupling means to cause said gripper device to withdraw from the shed according to a predetermined switching cycle in phase with a shot cycle.

2. The gripper device according to claim 1, wherein said first coupling means further comprises:
   third coupling means adapted to be non-rotatably fixed to said drive shaft; and
   a sliding part, said sliding part being engageable in a first position with said second coupling means and in a second position with said second and third coupling means.

3. The gripper device according to claim 2, wherein said second coupling means comprises a drive gear, the gripper device further comprising means for blocking said drive gear in a fixed position when said first and second coupling means are unengaged.

4. The gripper device according to claim 3, wherein said drive gear further comprises:
   a bearing adapted to be rotatably disposed on said drive shaft, and a cylindrical part adapted to extend symmetrically around said drive shaft while disposed on said bearing;
   said second coupling means further comprising a first tooth system provided on said cylindrical part;
   said third coupling means further comprising a driver ring adapted to be non-rotatably disposed on said driver shaft, said driver ring having the same external diameter as the cylindrical part;
   said driver ring further comprising a second tooth system; and
   said sliding part further comprising a sliding ring having a central cylindrical opening and a third tooth system, said sliding ring disposed coaxially with said drive shaft through said central opening;
   wherein said sliding ring is engageable in a first position with said first tooth system and in a second position with said first and second tooth systems.

5. The gripper device according to claim 4, wherein the gripper device further comprises means for blocking said drive gear in a fixed position when said sliding ring is in said first position.

6. The gripper device according to claim 5, wherein said blocking means further comprises a pin provided on said sliding ring, and means for engaging said pin with an opening in said drive gear provided opposite to said pin, said pin being engaged with said opening when said sliding ring is in said first position.

7. A device for a weaving loom having a drive shaft, which rotates in one direction of rotation and the other direction thereof in an alternate manner, comprising:
   a plurality of gripper devices, each gripper device comprising first coupling means adapted to be non-rotatably disposed on said drive shaft, second coupling means adapted to be rotatably disposed on said drive shaft, and means for synchronously engaging said first coupling means with said second coupling means to cause said gripper device to move into a shed between warp threads and for disengaging said first coupling means from said second coupling means to withdraw from the shed according to a predetermined switching cycle in phase with a shot cycle; and
   means for coupling and uncoupling the gripper devices so that, when a first gripper device is coupled to said drive shaft, at least one other gripper device is uncoupled.

8. The device for a weaving loom according to claim 7, wherein each gripper device further comprises:
   a bearing rotatably disposed on said drive shaft, and a cylindrical part extending symmetrically around said drive shaft while disposed on said bearing;
   said second coupling means further comprising a first tooth system provided on said cylindrical part;
   said third coupling means further comprising a driver ring non-rotatably disposed on said driver shaft, said driver ring having the same external diameter as the cylindrical part;
   said driver ring further comprising a second tooth system; and
   said sliding part further comprising a sliding ring having a central cylindrical opening and a third tooth system, said disposed coaxially with said drive shaft through said central opening, said sliding ring being engageable in a first position with said first tooth system and in a second position with said first and second tooth systems;
   the weaving loom device further comprising:
      a control device connected to each sliding ring; and
      means for moving said control device;
   wherein said control device moves each sliding ring into said first or second position according to a selected cycle which runs in phase With the shot cycle.

9. The device for a weaving loom according to claim 8, wherein said control device comprises a cam and rod mechanism.

10. The device for a weaving loom according to claim 8, further comprising means for adjusting said selected cycle.

11. A weaving loom system having a drive shaft, which rotates in one direction of rotation and the other direction thereof in an alternate manner, comprising a plurality of gripper devices, each gripper device comprising first coupling means non-rotatably disposed on said drive shaft, second coupling means rotatably disposed on said drive shaft, and means for synchronously engaging said first coupling means with said second coupling means to cause said gripper device to move into a shed between warp threads and for disengaging said first coupling means from said second coupling means cause said gripper device to withdraw from the shed according to a predetermined switching cycle in phase with a shot cycle.

12. The weaving loom according to claim 11, further comprising:
   three gripper devices in a linear configuration, wherein the middle gripper is fixedly coupled to said drive shaft; and
   means for synchronously coupling and uncoupling the first and second end grippers so that the first end gripper is coupled to said drive shaft in a first shot cycle and uncoupled in a second shot cycle, and the second end gripper is coupled to said drive shaft in said second shot cycle and uncoupled in said first cycle.

13. A method for switching a weft insertion means of a face-to-face loom having a plurality of superimposed weft insertion driving elements at different levels, and a common weft insertion means drive shaft, the method comprising the steps of:
   rotating the drive shaft in one direction of rotation and the other direction thereof in an alternate manner in an insertion cycle;

blocking a first weft insertion driving element to keep the driving element in a fixed reference position;

switching off the first weft insertion driving element;

unblocking a second weft insertion driving element; and switching on a second weft insertion driving element.

14. The method according to claim 13 wherein the steps are performed repeatedly so that the first and second weft insertion driving elements are alternately driven.

15. The method according to claim 13, wherein the loom has three weft insertion driving elements, the steps being performed repeatedly so that the first and second weft insertion driving elements are alternately driven while the third weft insertion driving element is driven continuously.

* * * * *

UNITED STATES PATENT AND TRADEMARK OFFICE
CERTIFICATE OF CORRECTION

PATENT NO. : 5,419,370

DATED : May 30, 1995

INVENTOR(S) : Dewispelaere et al.

Figure 2:
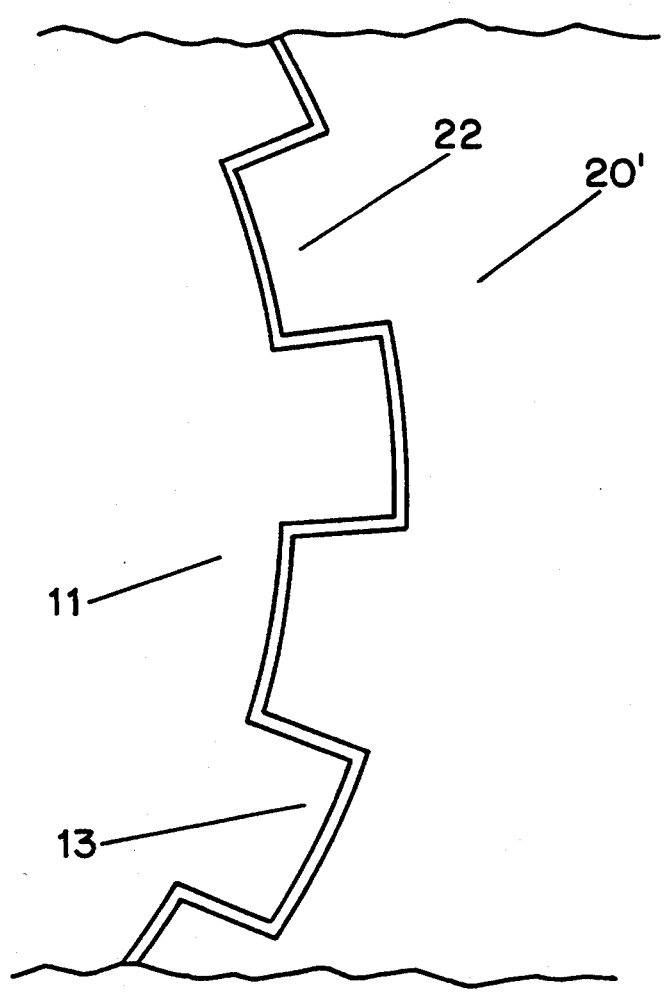
FIG. 2 illustrates a portion of an internal tooth system which meshes with a portion of an external tooth system within the device of FIG. 1.
Figure 3:
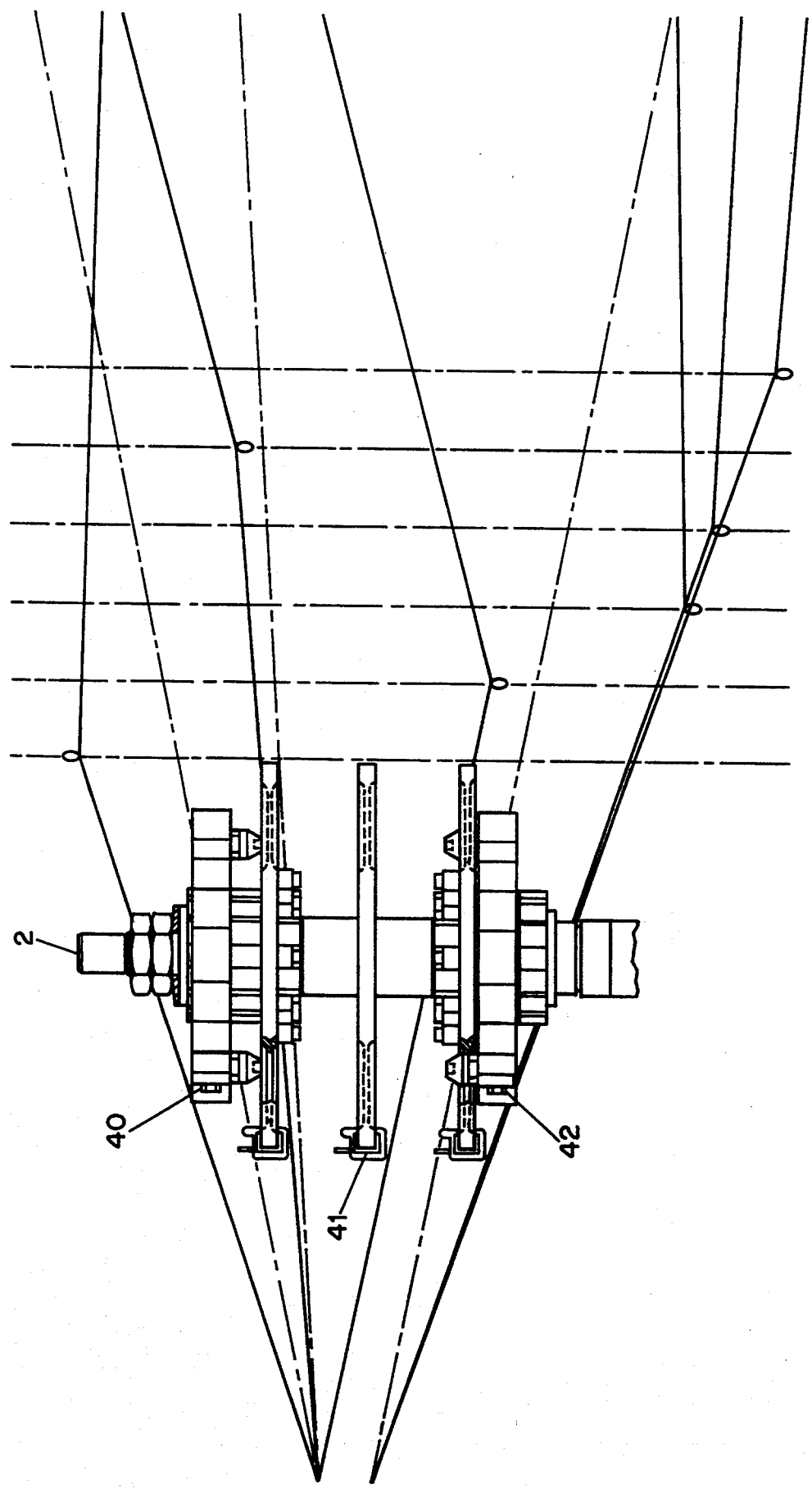
FIG. 3 shows another embodiment of the invention.

It is certified that error appears in the above-indentified patent and that said Letters Patent is hereby corrected as shown below:

Title page, Item 54, and Col. 1, first line, "GRIPER WELF" should read -- GRIPPER WEFT --;

Col. 2, line 55, "gripperde-" should read -- gripper de- --;

Col. 3, line 24, "of" should read -- use of --;

Col. 6, line 18, "co,and" should read -- command --;

Col. 6, line 47, "the driver" should read --of the driver--;

Col. 6, line 48, "said," should read -- said --;

Col. 6, line 63, "FIG. 2" should read --while shown in FIG. 2--;

Col. 8, line 20, "to, weave" should read -- to weave --;

Col. 8, line 21, "FIG. 3" should read --as shown in FIG. 3--;

Col. 10, line 16, "said disposed" should read -- said sliding ring disposed --;

UNITED STATES PATENT AND TRADEMARK OFFICE
CERTIFICATE OF CORRECTION

PATENT NO. : 5,419,370

DATED : May 30, 1995

INVENTOR(S) : Dewispelaere et al.

It is certified that error appears in the above-indentified patent and that said Letters Patent is hereby corrected as shown below:

Col. 10, line 27, "With" should read -- with --;

Col. 10, line 46, "cause" should read -- to cause --.

Signed and Sealed this

Seventeenth Day of October, 1995

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,419,370
DATED : May 30, 1995
INVENTOR(S) : Dewispelaere et al.

It is certified that error appears in the above-identified patent and that said Letters Patent is hereby corrected as shown below:

On the title page item [73], "N.V. MICHEL VAN DE WEILE" should read --N.V. MICHEL VAN DE WIELE--.

Signed and Sealed this

Twenty-eighth Day of May, 1996

Attest:

BRUCE LEHMAN

Attesting Officer     Commissioner of Patents and Trademarks